United States Patent
Hajmrle et al.

(10) Patent No.: US 7,267,889 B2
(45) Date of Patent: Sep. 11, 2007

(54) SPRAYABLE COMPOSITION

(75) Inventors: Karel Hajmrle, Edmonton (CA); Anthony Peter Chilkowich, Fort Saskatchewan (CA)

(73) Assignee: Sulzer Metco (Canada) Inc., British Columbia (CA)

( * ) Notice: Subject to any disclaimer, the term of this patent is extended or adjusted under 35 U.S.C. 154(b) by 341 days.

(21) Appl. No.: 10/490,735

(22) PCT Filed: Oct. 1, 2002

(86) PCT No.: PCT/CA02/01490

§ 371 (c)(1),
(2), (4) Date: Apr. 8, 2004

(87) PCT Pub. No.: WO03/031672

PCT Pub. Date: Apr. 17, 2003

(65) Prior Publication Data

US 2004/0247923 A1 Dec. 9, 2004

(30) Foreign Application Priority Data

Oct. 10, 2001 (CA) .................................. 2358624

(51) Int. Cl.
*B32B 15/04* (2006.01)
*B32B 15/18* (2006.01)
*B32B 15/20* (2006.01)
*B32B 18/00* (2006.01)
*C04B 35/01* (2006.01)

(52) U.S. Cl. ...................... 428/633; 428/614; 428/666; 428/680; 501/153; 501/154; 106/1.27; 106/286.1; 106/287.17; 106/457

(58) Field of Classification Search ................ 428/613, 428/614, 632, 633, 666, 680, 687; 427/452, 427/453, 455, 456; 501/153, 154; 106/1.27, 106/286.1, 286.8, 287.17, 457
See application file for complete search history.

(56) References Cited

U.S. PATENT DOCUMENTS 4,639,388 A 1/1987 Ainsworth et al.

FOREIGN PATENT DOCUMENTS

WO   WO95/12004   5/1995

OTHER PUBLICATIONS

Glassceramics obtained from industrial waste; R.Cimdins, I Rozenstrauha, L. Berzina, J. Bossert, M. Bucker; Resources, Conservation and Recycling; vol. 29,Issue 4; Jun. 1, 2000; pp. 285-290.*

* cited by examiner

*Primary Examiner*—Michael E. Lavilla
(74) *Attorney, Agent, or Firm*—Arne I. Fors

(57) ABSTRACT

The present invention provides a sprayable composition comprising a ceramic particulate including albite, illite, and quart, and a metallic composition, including nickel, chromium, iron, and silicon. The sprayable composition may be a composite particle, a blend, or a cored wire. The present invention further provides an abradable coating formed on a metal substrate according to a method comprising the step of depositing the abradable coating on the metal substrate by thermal spraying of a sprayable composition comprising a ceramic particulate including albite, illite, and quartz, and a metallic composition, including nickel, chromium, iron and silicon. The sprayable composition may be a composite particle, a blend, or a cored wire. The abradable coating may be applied to a metal substrate such as steel, nickel-based alloys, and titanium.

25 Claims, No Drawings

SPRAYABLE COMPOSITION

SUMMARY OF THE INVENTION

1. Field of the Invention

This invention relates to sprayable compositions, particularly to sprayable compositions for use in forming abradable coatings, as well as metal substrates coated with such abradable coatings.

2. Description of the Related Art

Abradable seals have originally been developed for jet engine applications. Recently, the technology developed in the past is being adapted to land based rotating equipment. Further challenges are encountered in those applications. Jet engines used in aircraft applications are refurbished more often than the counterpart land based equipment. In the former case, expected service life is typically 5000-10,000 hrs, whereas in the latter case, expected service life is at least 50,000 hours, and in many cases, substantially more. This imposes new requirements on the land based coatings, namely durability. In this respect, the coatings must retain their mechanical properties, including abradability, even after long exposure at elevated temperatures.

The present invention provides a sprayable composition comprising a ceramic particulate including albite, illite, and quartz, and a metallic composition including nickel. chromium, iron, and silicon.

The present invention also provides an abradable coating formed on a metal substrate according to a method comprising the step of depositing the abradable coating on the metal substrate by thermal spraying of a sprayable composition comprising a ceramic particulate including albite, illite, and quartz, and a metallic composition including nickel, chromium, iron and silicon. The abradable coating may be deposited on a metal substrate.

Even further, the present invention provides an abradable coating formed on a metal substrate according to a method comprising the steps of: depositing a bond coat on the substrate, and depositing an abradable coating on the bond coat by thermal spraying a sprayable composition comprising a ceramic particulate including albite, illite, and quartz and a metallic composition including nickel, chromium, iron and silicon. The abradable coating may be deposited on a metal substrate.

In this respect, the present invention further provides a metal substrate including an abradable coating adhered thereto, the abradable coating becoming adhered to the metal substrate according to a method comprising the step of depositing the abradable coating on the metal substrate by thermal spraying of a sprayable composition comprising a ceramic particulate including albite, illite, and quartz, and a metallic composition including nickel, chromium, iron and silicon. The abradable coating may be deposited on a metal substrate.

The present invention also provides a metal substrate including an abradable coating adhered thereto, the abradable coating becoming adhered to the metal substrate according to a method comprising the steps of: depositing a bond coat on the substrate, and depositing an abradable coating on the bond coat by thermal spraying a sprayable composition comprising a ceramic particulate including albite, illite, and quartz and a metallic composition including nickel, chromium, iron and silicon.

In one aspect, the sprayable composition is a powder composite, wherein the metallic composition is adhered to the ceramic particulate.

In another aspect, the sprayable composition is a powder blend, wherein the ceramic particulate is blended with the metallic composition.

In yet another aspect, the sprayable composition is a cored wire comprising an envelope including the metallic composition, wherein the ceramic particulate is disposed within the envelope.

In yet another aspect, the ceramic particulate of the invention as described above includes about 20 to about 60 weight percent albite, about 15 to about 45 weight percent illite, and about 15 to about 45 weight percent quartz.

In another aspect, the ceramic particulate of the present invention includes about 40 weight percent albite, about 30 weight percent illite, and about 30 weight percent quartz.

In another aspect, the metallic composition of any of the aspects of the present invention includes about 14 to about 25 weight percent chromium, about 1.5 to about 4 weight percent iron, and about 0.1 to about 0.6 weight percent silicon, and the balance essentially nickel.

DESCRIPTION OF THE PREFERRED EMBODIMENT

The present invention provides a sprayable composition, for use in thermal spray applications, comprising a ceramic particulate including albite, illite, and quartz and a metallic composition including nickel, chromium, iron and silicon. The sprayable composition may be applied to, or coated or deposited upon a substrate to form an abradable coating or seal.

In another embodiment, the sprayable composition comprises a ceramic particulate including albite or a mineral possessing the characteristics of albite such as anorthite, illite or a mineral possessing the characteristics of illite, and quartz, and a metallic composition including metal, chromium, iron, and silica.

The sprayable composition of the present invention may be applied to various substrates including those used in the thermal spray industry such as steel, nickel-based alloys and titanium.

The sprayable composition of the present invention may be applied to any of the above-enumerated substrates by thermal spraying. Preferably, a bond coat is first deposited onto the substrate to aid the adhesion of the abradable seal coating. Bond coats are well known in the art. Exemplary bond coats include Metco-45ONS (trade-mark of Perkin-Elmer), which is 95% Ni./5% Al, nickel chromium coatings, and nickel chromium aluminum yttrium coatings.

Thermal spraying involves the softening or melting of a heat fusible material such as metal or ceramic by heat, and propelling the softened or melted material in particulate form against a surface which is to be coated. The heated particles strike the surface where they are cooled and bonded thereto. A conventional thermal spray gun may be used for the purpose of both heating and propelling the particles.

A thermal spray gun normally utilizes a combustion or plasma flame or electric arc to produce the heat for melting of the powder particles. In a powder type combustion thermal spray gun, the carrier gas, which entrains and transports the powder, is typically an inert gas such as nitrogen. In a plasma spray gun, the primary plasma gas is generally nitrogen or argon. Hydrogen or helium is usually added to the primary gas, and the carrier gas is generally the same as the primary plasma gas. Other thermal spray methods could also be used. A good general description of thermal spraying is provided in U.S. Pat. No. 5,049,450.

There is also provided an abradable coating formed on a metal substrate according to a method comprising the step of depositing the abradable coating on the metal substrate by thermal spraying of a sprayable composition comprising a ceramic particulate including albite, illite, and quartz, and a metallic composition including nickel, chromium, iron and silicon. In another embodiment, an abradable coating formed on a metal substrate according to a method comprising the steps of depositing a bond coat on the substrate, and depositing an abradable coating on the bond coat by thermal spraying a sprayable composition comprising a ceramic particulate including albite, illite, and quartz, and a metallic composition including nickel, chromium, iron and silicon.

In this respect, the present invention also provides a metal substrate including an abradable coating adhered thereto, the abradable coating becoming adhered to the metal substrate according to a method comprising the step of depositing the abradable coating on the metal substrate by thermal spraying of a sprayable composition comprising a ceramic particulate including albite, illite, and quartz, and a metallic composition including nickel, chromium, iron and silicon. In another embodiment, the present invention provides a metal substrate including an abradable coating adhered thereto, the abradable coating becoming adhered to the metal substrate according to a method comprising the steps of depositing a bond coat on the substrate, the depositing an abradable coating on the bond coat by thermal spraying a sprayable composition comprising a ceramic particulate including albite, illite, and quartz, and a metallic composition including nickel, chromium, iron and silicon.

The present invention further provides a metal substrate including an abradable coating adhered thereto, the abradable coating comprising a matrix including a metallic composition including nickel, chromium, iron and silicon, and a ceramic particulate including albite, illite, and quartz, wherein the ceramic particulate is dispersed within the matrix.

In one embodiment, the sprayable composition is a blend of a ceramic particulate including albite, illite, and quartz and a metallic composition, such as a particulate, including nickel, chromium, iron, and silicon.

In another embodiment, the sprayable composition is a cored wire comprising an envelope including the metallic composition, wherein the ceramic particulate is disposed within the envelope.

In another embodiment, the sprayable composition is a composite powder, wherein the metallic composition is adhered to a surface of the ceramic particulate. In one aspect, the metallic composition encapsulates the ceramic particulate.

By including albite, illite, and quartz, the ceramic particulate imparts desirable mechanical properties to the abradable coating, such as good erosion resistance combined with good abradability.

in another embodiment, the ceramic particulate includes about 20 to about 60 wt % albite, about 15 to about 45 wt % illite, and about 15 to about 45 wt % quartz. In a further embodiment, the ceramic particulate includes about 40 wt % albite, about 30 wt % illite, and about 30 wt % quartz.

In a further embodiment, the ceramic particulate consists essentially of albite, illite and quartz. Other materials may be present in the ceramic particulate in small quantities. These other materials are present as impurities introduced into the ceramic particulate as by-products arising during processing or from the raw materials. These other materials are present in amounts which are not sufficiently significant to effect the desirable properties of the ceramic particulate. In particular, the impurities are present in amounts which does not compromise the desired abradability and long term stability of the abradable coating.

In another embodiment, the metallic composition or particulate includes about 14 to about 25 wt % chromium, about 1.5 to about 4.0 wt % iron, and about 0.1 to about 0.6 wt % silicon, and the balance essentially nickel.

In a further embodiment, the metallic composition or particulate includes about 15.0 to about 18.1 wt % chromium, about 2.45 to about 2.71 wt % iron, about 0.43 to about 0.45 wt % silicon, and the balance essentially nickel. The coating derived from this embodiment particularly provides superior coating oxidation resistance in air up to about 650° C. The oxidation weight gain stabilizes at about 8000 hours in air. The mechanical properties of the coating derived from this composition are also stable under the same conditions. The resultant coating has a combination of excellent mechanical properties and oxidation resistance. Nevertheless, such specific intrinsic properties are not critical or necessary for the practice of each of the embodiments of this invention.

In a further embodiment, the metallic composition or particulate consists essentially of nickel, chromium, iron, and silicon. When the term "essentially" is used with respect to any of the above-described embodiments of the metallic composition or particulate of the present invention, this means that other materials may be present in the metallic composition in small quantities. These other materials are present as impurities introduced into the metallic composition as by-products arising during processing or from the raw materials. These other materials are present in amounts which are not sufficiently significant to effect the desired properties of the metallic composition. In particular, the impurities are present in amounts which do not compromise oxidation resistance and mechanical properties of the resultant coating.

The sprayable composition of the present invention is sufficiently flexible to provide coatings tailored to a specific application. When a coarser powder particle size is used, say, −80 mesh +115 mesh (−180 micrometers+125 micrometers), soft coatings can be produced to rub against hardware that are susceptible to damage by interaction with softer coatings. Examples of such hardware are blades and knife edges. If more robust hardware is used, then harder, more erosion-resistant coatings can be produced using finer powder where most of the particles are in the −100 mesh+325 mesh range (−150 micrometers+44 micrometers).

The ceramic particulate can be produced by agglomerating individual fine ceramic particle constituents (albite, illite, and quartz) using organic or inorganic binders and then milling the individual components in an attrition mill. Suitable organic binders include Derakane 470-36™ produced by Dow Chemical. The ceramic-binder mixture in then cured at room temperature for about 18 hours and the particles are subsequently screened to the desired particle size or size range required for the application.

After the ceramic particulate is sized, a metal composition is deposited thereon. As a first step, the ceramic particulate may be clad with Ni via hydrometallurgical processing. In this respect, dissolved Ni complexes are precipitated out of solution onto nucleation sites on the ceramic particulate via hydrogen reduction cycles at about 180° C. and 500 psig $H_2$. After the Ni is precipitated onto the ceramic particulate, the resultant particles are washed and dried. The Ni-clad ceramic particulate is then alloyed with Cr using any one of a number of diffusion processes, such as chemical vapor deposition. Without wishing to be bound by theory, it is believed that Fe and Si diffuse from the ceramic particulate core, and particularly the illite constituent, into the metal composition during the heat treatment.

It will be understood, of course, that modifications can be made in the embodiments of the invention described herein without departing from the scope and purview of the invention as defined by the appended claims.

The invention claimed is:

1. A sprayable composition comprising:
   a ceramic particulate consisting essentially of albite, illite, and quartz; and
   a metallic composition including nickel, chromium, iron, and silicon.

2. The sprayable composition as claimed in claim 1, wherein the metallic composition is adhered to the ceramic particulate.

3. The sprayable composition as claimed in claim 1, wherein the metallic composition is adhered to a surface of the ceramic particulate.

4. The sprayable composition as claimed in claim 3, wherein the sprayable composition is a composite powder.

5. The sprayable composition as claimed in claim 1, wherein the sprayable composition is a cored wire comprising an envelope including the metallic composition, and wherein the ceramic particulate is disposed within the envelope.

6. The sprayable composition as claimed in claim 1, wherein the metallic composition is blended with the ceramic particulate.

7. The sprayable composition as claimed in claim 6, wherein the metallic composition is a metallic particulate.

8. The sprayable composition as claimed in claim 1 wherein the ceramic particulate includes about 20 to about 60 weight percent albite, about 15 to about 45 weight percent illite, and about 15 to about 45 weight percent quartz.

9. The sprayable composition as claimed in claim 1 wherein the ceramic particulate includes about 40 weight percent albite, about 30 weight percent illite, and about 30 weight percent quartz.

10. The sprayable composition as claimed in claim 1, wherein the metallic composition includes about 14 to about 25 weight percent chromium, about 1.5 to about 4 weight percent iron, and about 0.1 to about 0.6 weight percent silicon, and the balance essentially nickel.

11. A metal substrate including an abradable coating adhered thereto, the abradable coating becoming adhered to the metal substrate according to a method comprising the step of depositing the abradable coating on the metal substrate by thermal spraying of a sprayable composition comprising:
    a ceramic particulate including albite, illite, and quartz; and
    a metallic composition, including nickel, chromium, iron and silicon.

12. The metal substrate as claimed in claim 11, wherein the metallic composition is adhered to the ceramic particulate.

13. The metal substrate as claimed in claim 11 wherein the ceramic particulate consists essentially of albite, illite, and quartz.

14. The metal substrate as claimed in claim 11 wherein the ceramic particulate includes about 20 to about 60 weight percent albite, about 15 to about 45 weight percent illite, and about 15 to about 45 weight percent quartz.

15. The metal substrate as claimed in claim 11 wherein the ceramic particulate includes about 40 weight percent albite, about 30 weight percent illite, and about 30 weight percent quartz.

16. The metal substrate as claimed in claim 11 wherries the metallic composition includes about 14 to about 25 weight percent chromium, about 1.5 to about 4 weight percent iron, and about 0.1 to about 0.6 weight percent silicon, and the balance essentially nickel.

17. A metal substrate including an abradable coating adhered thereto, the abradable coating becoming adhered to the metal substrate according to a method comprising the steps of:
    depositing a bond coat on the substrate; and
    depositing an abradable coating on the bond coat by thermal spraying a sprayable composition comprising:
       a ceramic particulate including albite, illite, and quartz; and
       a metallic composition including nickel, chromium, iron and silicon.

18. The metal substrate as claimed in claim 17, wherein the metallic composition is adhered to a surface of the ceramic particulate.

19. The metal substrate as claimed in claim 18, wherein the sprayable composition is a composite powder.

20. The metal substrate as claimed in claim 19 wherein the ceramic particulate consists essentially of albite, illite, and quartz.

21. A metal substrate including an abradable coating adhered thereto, the abradable coating comprising:
    a matrix including a metallic composition, the metallic composition including nickel, chromium, iron and silicon; and
    a ceramic particulate, including albite, illite, and quartz;
    wherein the ceramic particulate is dispersed within the matrix.

22. The metal substrate as claimed in claim 21, wherein the ceramic particulate consists essentially of albite, illite and quartz.

23. The metal substrate as claimed in claim 21 wherein the ceramic particulate includes about 20 to about 60 weight percent albite, about 15 to about 45 weight percent illite, and about 15 to about 45 weight percent quartz.

24. The metal substrate as claimed in claim 21 wherein the ceramic particulate includes about 40 weight percent albite, about 30 weight percent illite, and about 30 weight percent quartz.

25. The metal substrate as claimed in claim 21 wherein the metallic composition includes about 14 to about 25 weight percent chromium, about 1.5 to about 4 weight percent iron, and about 0.1 to about 0.6 weight percent silicon, and the balance essentially nickel.

* * * * *